(12) United States Patent
Asako et al.

(10) Patent No.: US 9,290,152 B2
(45) Date of Patent: Mar. 22, 2016

(54) SEAT BELT RETRACTOR AND SEAT BELT ASSEMBLY INCLUDING SAME

(75) Inventors: Tadayuki Asako, Tokyo (JP); Takashi Sakano, Tokyo (JP)

(73) Assignee: Takata Corporation, Tokyo (JP)

( * ) Notice: Subject to any disclaimer, the term of this patent is extended or adjusted under 35 U.S.C. 154(b) by 128 days.

(21) Appl. No.: 14/345,796

(22) PCT Filed: Aug. 7, 2012

(86) PCT No.: PCT/JP2012/070087
§ 371 (c)(1),
(2), (4) Date: Mar. 19, 2014

(87) PCT Pub. No.: WO2013/042473
PCT Pub. Date: Mar. 28, 2013

(65) Prior Publication Data
US 2014/0224916 A1    Aug. 14, 2014

(30) Foreign Application Priority Data

Sep. 21, 2011 (JP) .................................. 2011-205620

(51) Int. Cl.
*B60R 22/40* (2006.01)
*B60R 22/34* (2006.01)
(Continued)

(52) U.S. Cl.
CPC ................. *B60R 22/34* (2013.01); *B60R 22/36* (2013.01); *B60R 22/46* (2013.01); *B60R 2022/4473* (2013.01); *B60R 2022/468* (2013.01);
(Continued)

(58) Field of Classification Search
CPC ......................... B60R 22/34; B60R 2022/4473

USPC .................................................. 242/379, 389
See application file for complete search history.

(56) References Cited

U.S. PATENT DOCUMENTS

| 4,522,350 | A | 6/1985 | Ernst |
| 5,794,876 | A * | 8/1998 | Morizane et al. ............. 242/374 |

(Continued)

FOREIGN PATENT DOCUMENTS

| CN | 1607133 A | 4/2005 |
| CN | 1853991 A | 11/2006 |

(Continued)

OTHER PUBLICATIONS

Notice of Reasons for Rejection dated May 13, 2015 which issued in Japanese Patent Application No. 2011-205620, with English translation.

(Continued)

*Primary Examiner* — Sang Kim
(74) *Attorney, Agent, or Firm* — Foley & Lardner LLP

(57) ABSTRACT

[Object] Quietness is to be more effectively improved, without compromising stability in power transmission.
[Solution] An annular internal gear member 24 is formed of a noise suppressing material having lower strength than a metal. A deformation restricting portion 22d of an annular flange shape is formed along an outer circumferential edge of a carrier 22. Accordingly, when a planetary gear mechanism is operating the internal gear member 24 is partially deformed so as to protrude radially outward of the annular shape. At this point, the protruding deformed portion of the internal gear member 24 abuts against an inner circumferential surface of the deformation restricting portion 22d. Therefore, deformation of the internal gear member 24 is effectively restricted.

7 Claims, 13 Drawing Sheets

(51) Int. Cl.
  *B60R 22/36* (2006.01)
  *B60R 22/46* (2006.01)
  *B60R 22/44* (2006.01)

(52) U.S. Cl.
  CPC . *B60R2022/4642* (2013.01); *B60R 2022/4666* (2013.01)

(56) References Cited

U.S. PATENT DOCUMENTS

| | | | |
|---|---|---|---|
| 2006/0214043 A1* | 9/2006 | Nomura | 242/374 |
| 2006/0243847 A1 | 11/2006 | Nomura | |
| 2006/0267331 A1* | 11/2006 | Tanaka | 280/806 |
| 2008/0174098 A1 | 7/2008 | Takao et al. | |

FOREIGN PATENT DOCUMENTS

| | | |
|---|---|---|
| CN | 101426672 A | 5/2009 |
| JP | 04-029461 U | 3/1991 |
| JP | H08-133015 | 5/1996 |
| JP | 2001-347922 | 12/2001 |
| JP | 2001-347923 | 12/2001 |
| JP | 2002-104135 | 4/2002 |
| JP | 2002-200965 A | 7/2002 |
| JP | 2002-211355 | 7/2002 |
| JP | 2002-220028 A | 8/2002 |
| JP | 2005-231388 A | 9/2005 |
| JP | 2006-027559 | 2/2006 |
| JP | 2006-159982 A | 6/2006 |
| JP | 2006-290124 | 10/2006 |
| JP | 2007-038902 | 2/2007 |
| JP | 2009-280007 A | 12/2009 |
| JP | 4458526 B2 | 4/2010 |
| JP | 2011-245950 | 12/2011 |

OTHER PUBLICATIONS

International Search Report mailed Oct. 23, 2012 issued in connection with International Application No. PCT/JP2012/070087, with English Translation.

Chinese Office Action dated Sep. 2, 2015 issued in Chinese Patent Application No. 201280046274.3, 5 pages.

* cited by examiner

PRIOR ART

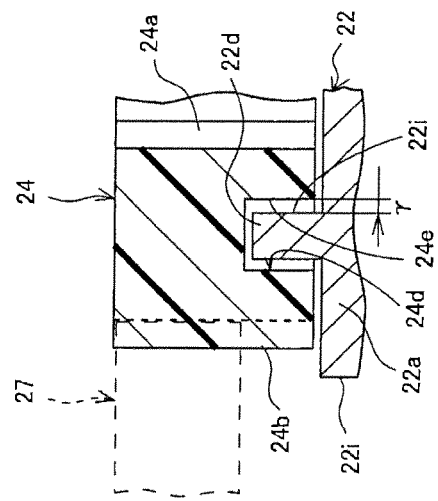
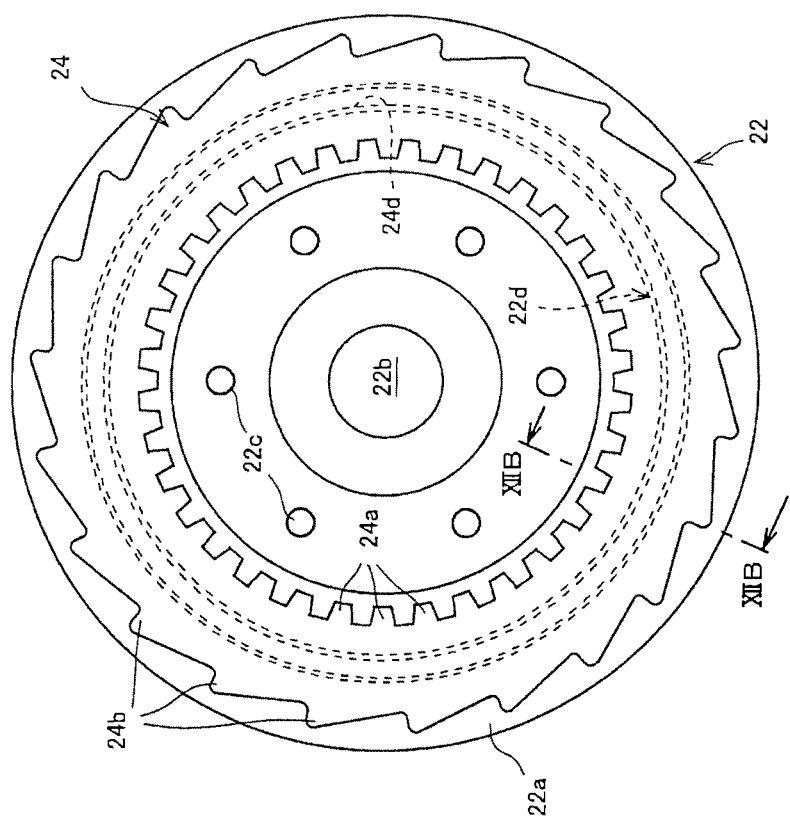
FIG. 12(A)
FIG. 12(B)

PRIOR ART

SEAT BELT RETRACTOR AND SEAT BELT ASSEMBLY INCLUDING SAME

CROSS REFERENCE TO RELATED APPLICATIONS

The present application is a U.S. National Stage of International Application No. PCT/JP2012/070087 filed on Aug 7, 2012 which claims the benefit of Japanese Patent Application No. 2011-205620 filed on Sep. 21, 2011. The entire disclosures of which are Incorporated herein by reference.

Technical Field

The present invention relates to a seat belt retractor provided in a vehicle such as an automobile and configured to retract a seat belt for binding an occupant with a spool to which rotation of a motor is transmitted at a reduced speed via a power transmission mechanism including a planetary gear mechanism, and to a seat belt unit that includes such a seat belt retractor.

Background Art

The seat belt unit thus far provided in a vehicle such as an automobile binds the occupant with the seat belt in an emergency case where a large deceleration is exerted on the vehicle, for example in a case of collision, thus to prevent the occupant from being thrown out of the vehicle.

The seat belt unit includes a seat belt retractor for retracting the seat belt. The seat belt retractor includes a spring mechanism such as a coil spring that constantly biases a spool for taking up the seat belt in a seat belt retracting direction. With the biasing force of the spring mechanism, the entirety of the seat belt (the free portion of the seat belt that the spring mechanism is capable of retracting, hereinafter the same) is wound on the spool, when the seat belt is not in use. To use the seat belt, the seat belt is withdrawn against the biasing force of the spring mechanism and fitted on the occupant. In an emergency case as stated above, a lock mechanism of the seat belt retractor is activated and inhibits the rotation of the spool in the withdrawal direction, thereby restricting further withdrawal of the seat belt. Thus, the seat belt serves to bind the occupant in the emergency case.

Regarding such conventional seat belt retractors, various proposals have been made on the mechanism for adjusting the binding force imposed on the occupant, by transmitting rotation of a motor at a reduced speed to the spool via a power transmission mechanism including a planetary gear mechanism, and taking up the seat belt on the spool with the driving torque of the motor so as to control the tension of the seat belt according to the driving condition of the vehicle, for example as disclosed in Patent Literature (PTL) 1.

Referring to FIG. 14(A), a planetary gear mechanism 100 employed in the power transmission mechanism of the seat belt retractor according to PTL 1 includes a sun gear 101 to which the rotation of the motor is transmitted, a carrier 102, a predetermined number of planet gears 103, and an annular internal gear 104. In the planetary gear mechanism 100, the driving torque of the motor is transmitted to the sun gear 101, and to the spool of the seat belt retractor via the carrier 102 supporting the planet gears 103. In this case, the internal gear 104 of the planetary gear mechanism 100 is allowed to rotate. In addition, the power transmission mechanism includes a clutch pawl 105 that controls the rotation of the internal gear 104 so as to connect and disconnect the power transmission route in the planetary gear mechanism 100.

In the seat belt retractor according to PTL 1, the internal gear 104 is allowed to rotate when a lock nail 105a of the clutch pawl 105 is not engaged with any of ratchet teeth 104a of the internal gear 104, and hence the power transmission route in the power transmission mechanism is disconnected. Accordingly, the driving torque of the motor transmitted to the sun gear 101 is not transmitted to the spool via the carrier 102. In contrast, when the lock nail 105A of the clutch pawl 105 is engaged with one of the ratchet teeth 104a of the internal gear 104 as shown in FIG. 14(A), the internal gear 104 is restricted from rotating in the seat belt retracting direction $\beta$, and hence the power transmission route in the power transmission mechanism is connected. Accordingly, the driving torque of the motor transmitted to the sun gear 101 is transmitted to the spool via the carrier 102.

CITATION LIST

Patent Literature

PTL 1: Japanese Patent No. 4458526

Summary of Invention

Technical Problem

Now, the components of the planetary gear mechanism 100 employed in the conventional seat belt retractor are, generally, made of a metal such as iron and aluminum. Because of the components of the planetary gear mechanism 100 being made of a metal, noise is generated when the planetary gear mechanism 100 is operated, owing to collision and contact between the metals. Accordingly, the planetary gear mechanism 100 employed in the conventional seat belt retractor has a drawback in that quietness is not sufficiently secured.

Therefore, it is required to improve the quietness of the planetary gear mechanism 100 as much as possible. One of the components of the planetary gear mechanism 100 that may contribute to improving the quietness is the annular internal gear 104. Forming the internal gear 104 from a noise suppressing material that generates less noise than metals, for example a synthetic resin, leads to improvement of the quietness of the planetary gear mechanism 100 in the seat belt retractor.

In the case of forming the internal gear 104 from a noise suppressing material such as a synthetic resin, the mechanical strength of the internal gear 104 is degraded compared with the internal gear 104 made of a metal. When the seat belt is about to be withdrawn by the inertia of the occupant with the internal gear 104 restricted by the clutch pawl 104 from rotating in the seat belt withdrawal direction, the tip portion of an outer tooth 103a of the planet gear 103 is made to abut the tip portion of an inner tooth 104b of the internal gear 104, as shown in FIG. 14(B). At this point, the inner tooth 104b is subjected to a force of the outer tooth 103a pressing the inner tooth 104b outward (generally downward in FIG. 14(B)), and therefore stress is concentrated at the meshing interface between the internal gear 104 and the clutch pawl 105 and the vicinity thereof, which may cause partial elastic deformation (distortion) of the annular internal gear 104 so as to protrude radially outward, as indicated by dash-dot-dot lines in FIG. 14(A). In this case, the internal gear 104 is deformed to a largest extent in the vicinity of the planet gear 103 closest to the meshing interface between the internal gear 104 and the clutch pawl 105 in the rotation direction $\beta$ of the carrier 102 to retract the seat belt. Such largest deformation of the internal gear 104 sequentially propagates in the rotation direction $\beta$ of the carrier 102 to retract the seat belt. With such deformation of the internal gear 104, the respective phases of the outer teeth 103a of the planet gear 103 and the inner teeth 104b of the internal gear 104 are relatively shifted. Then one of the outer teeth 103a of the planet gear 103 may skip over the corresponding inner tooth 104b of the internal gear 104, thus disabling stable transmission of power in the planetary gear mechanism.

Further, the seat belt retractor is required to be small and compact because of being provided inside the vehicle interior. However, in order to restrict the radially outward deformation of the internal gear 104 only with the strength of the material that suppresses the noise, the internal gear 104 has to be significantly larger, which naturally leads to loss of compactness of the seat belt retractor.

The present invention has been accomplished in view of the foregoing situation, and provides a seat belt retractor that more effectively improves quietness and stability in power transmission without compromising compactness, and a seat belt unit that includes such a seat belt retractor.

Solution to Problem

In an aspect, the present invention provides a seat belt retractor including at least a spool on which a seat belt is taken up, a motor that generates a driving torque for rotating the spool, and a power transmission mechanism that transmits the driving torque of the motor to the spool via a planetary gear mechanism, the seat belt retractor being configured to take up the seat belt on the spool by using the driving torque of the motor. The planetary gear mechanism includes a sun gear to which the driving torque of the motor is transmitted, a rotatable internal gear member including inner teeth formed along an inner circumferential surface and ratchet teeth formed along an outer circumferential surface, a predetermined number of planet gears each meshed with both of the sun gear and the inner teeth of the internal gear member, and a carrier that rotatably supports the predetermined number of planet gears and transmits the driving torque of the motor to the spool. The power transmission mechanism includes a clutch pawl set to move between a non-operating position where the clutch pawl is disengaged from the ratchet teeth of the internal gear member thereby allowing the internal gear member to rotate thus disconnecting a power transmission route and an operating position where the clutch pawl is engaged with one of the ratchet teeth of the internal gear member thereby inhibiting the internal gear member from rotating thus connecting the power transmission route. The internal gear member is formed of a noise suppressing material that suppresses noise generated when the planetary gear mechanism is operating, and the seat belt retractor further includes a deformation restricting portion that restricts deformation of the internal gear member.

In the foregoing seat belt retractor, the deformation restricting portion may be provided in the carrier.

In the foregoing seat belt retractor, the carrier may include an annular portion, and the deformation restricting portion may be formed in an annular shape along the annular portion of the carrier so as to restrict deformation of the internal gear member when the internal gear member about to be deformed makes contact with the deformation restricting portion.

Further, in the foregoing seat belt retractor, the deformation restricting portion may be continuously formed along the entire circumference of the annular shape thereof, or discontinuously formed along the circumference of the annular shape thereof in predetermined regions of the carrier opposing the respective planet gears.

Further, in the foregoing seat belt retractor, the annular deformation restricting portion may be formed as an annular flange or an annular projection.

Still further, in the foregoing seat belt retractor, the noise suppressing material may be formed of a synthetic resin.

In another aspect, the present invention provides a seat belt unit including at least a seat belt that binds an occupant, a seat belt retractor that retracts the seat belt, a tongue slidably supported by the seat belt, and a buckle in which the tongue is inserted to be engaged therewith, the seat belt being arranged to be fitted on the occupant when the tongue is inserted in the buckle and engaged therewith. The seat belt retractor is one of the seat belt retractors cited above.

Advantageous Effects of Invention

In the seat belt retractor configured as above according to the present invention, the internal gear member of the planetary gear mechanism employed in the power transmission mechanism is formed of the noise suppressing material, and therefore generation of noise can be suppressed during the operation of the planetary gear mechanism. Accordingly, the quietness can be effectively improved.

Since the internal gear member is formed of a noise suppressing material, the strength of the internal gear member is degraded compared with the case where the internal gear member is formed of a metal and hence the internal gear member is prone to be partially elastically deformed so as to protrude radially outward of the annular shape. However, the seat belt retractor includes the deformation restricting portion that restricts the deformation of the internal gear member, and therefore the internal gear member can be effectively prevented from being deformed. Such a configuration allows the outer teeth of the planet gear and the inner teeth of the internal gear member to be stably meshed with each other, thereby allowing the planet gear to smoothly rotate. Thus, the planetary gear mechanism in the power transmission mechanism is capable of effectively improving the quietness and stabilizing the power transmission.

In addition, the deformation restricting portion serves to restrict the deformation of the internal gear member only when it is necessary to restrict the deformation. Accordingly, the internal gear member is kept from contacting the deformation restricting portion during normal operation. Therefore, despite the internal gear member being formed of a noise suppressing material which is relatively susceptible to wear, the wear of the internal gear member due to contacts with the deformation restricting portion can be reduced, and also generation of noise because of a contact between the internal gear member and the deformation restricting portion can be suppressed. In particular, forming the deformation restricting portion on the carrier as an annular flange or an annular projection effectively protects the internal gear member from wearing with a simple structure, and effectively suppresses generation of noise due to the contact between the internal gear member and the deformation restricting portion.

Further, although the strength of the internal gear member is degraded because of employing a noise suppressing material to form the internal gear member, the deformation restricting portion serves to prevent the deformation of the internal gear member. Such a configuration allows the internal gear member to be made small and compact, thereby allowing the seat belt retractor to maintain the compactness.

Still further, the seat belt unit according to the present invention incorporated with the foregoing seat belt retractor is capable of further improving the quietness inside the vehicle interior and reliability in binding performance for the occupant, since the seat belt retractor is capable of improving the quietness and stability in power transmission.

BRIEF DESCRIPTION OF DRAWINGS

FIG. 12(A) is a schematic plan view showing a carrier and an internal gear member of a seat belt retractor according to still another embodiment of the present invention, and FIG. 12(B) is an enlarged fragmentary cross-sectional view taken along a line XIIB-XIIB in FIG. 12(A).

DESCRIPTION OF EMBODIMENTS

Hereafter, embodiments of the present invention will be described with reference to the drawings.

Figure 1:
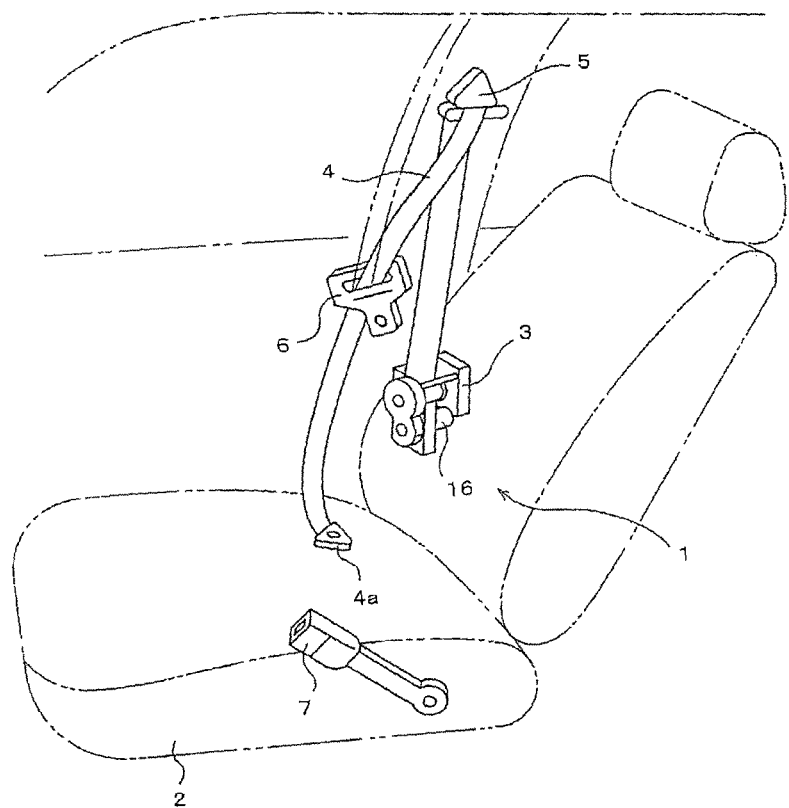
FIG. 1 is a schematic perspective view showing a seat belt unit that includes a seat belt retractor according to an embodiment of the present invention.

FIG. 1 is a schematic perspective view showing a seat belt unit that includes a seat belt retractor according to an embodiment of the present invention.

As shown in FIG. 1, the seat belt unit assembly according to this embodiment is basically the same as a conventionally known three-point seat belt unit. In FIG. 1, a reference numeral 1 designates the seat belt unit, 2 designates a vehicle seat, 3 designates a seat belt retractor attached to the vehicle body in the vicinity of the vehicle seat 2, 4 designates a seat belt that can be withdrawably retracted in the seat belt retractor 3 and including a belt anchor 4a attached to a leading end thereof via which the seat belt 4 is fixed to the vehicle floor or the vehicle seat 2, 5 designates a belt guide anchor that guides the seat belt 4 withdrawn from the seat belt retractor 3 to a shoulder of the occupant, 6 designates a tongue slidably supported by the seat belt 4 extending from the belt guide anchor 5, and 7 designates a buckle fixed to the vehicle floor or the vehicle seat 2 and in which the tongue 6 is to be removably inserted for connection. The fastening and releasing operation of the seat belt 4 of the seat belt unit 1 is also the same as that of the conventionally known seat belt unit.

Figure 2B:
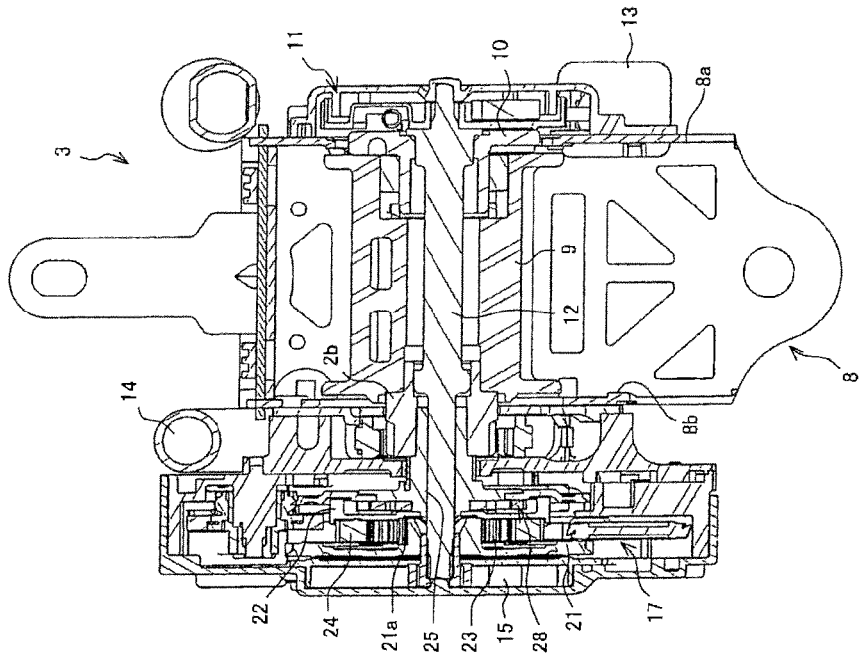
FIG. 2(B) is a cross-sectional view taken along a line IIB-IIB in FIG. 2(A).
Figure 2A:
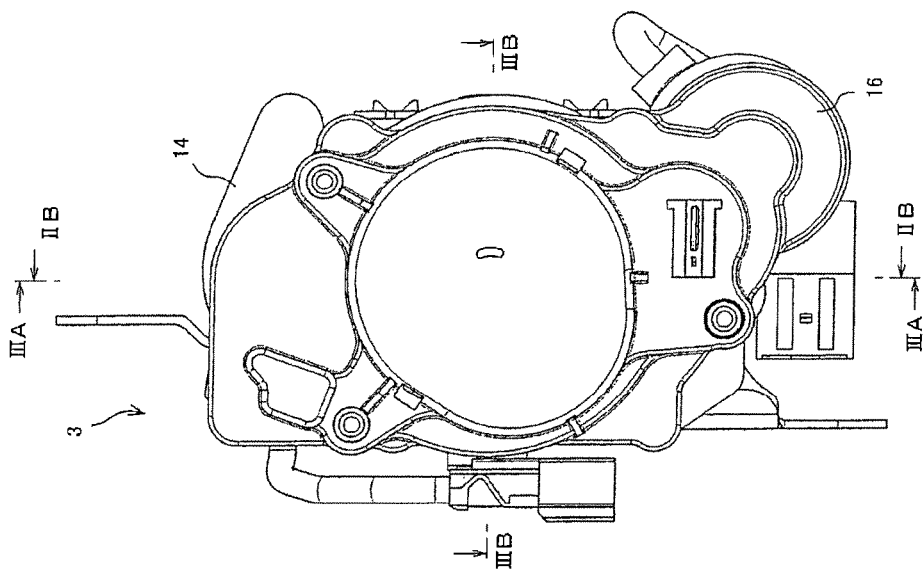
FIG. 2(A) is a left side view of the seat belt retractor according to the embodiment.

As shown in FIGS. 2(A), 2(B) and FIGS. 3(A), 3(B), the seat belt retractor 3 according to this embodiment includes a U-shaped frame 8 including a left and right sidewalls 8a, 8b (see FIG. 2(B)), a spool 9 on which the seat belt 4 is taken up, a locking base 10 that normally rotates together with the spool 9 but is restricted from rotating in a direction for withdrawing the seat belt in an emergency case such as collision where a deceleration larger than a predetermined level is imposed, a lock mechanism 11 provided on the sidewall 8a of the frame 8 and configured to be activated in an emergency case so as to restrict the locking base 10 from rotating in the seat belt withdrawal direction, a torsion bar 12 provided between the spool 9 and the locking base 10 for absorbing energy, a deceleration sensing mechanism 13 provided on the sidewall 8a of the frame 8 and configured to detect a large deceleration in an emergency case and activate the lock mechanism 11, a pretensioner 14 provided on the frame 8 to be activated at an initial stage of an emergency case so as to cause the spool 9 to rotate in the seat belt retracting direction, a spring mechanism 15 provided on the sidewall 8b of the frame 8 to constantly bias the spool 9 in the seat belt retracting direction, a motor 16 provided on the sidewall 8b of the frame 8 to generate a driving torque for causing the spool 9 to rotate, and a power transmission mechanism 17 provided on the sidewall 8b of the frame 8 to transmit the driving torque of the motor 16 to the spool 9 at a reduced speed. Accordingly, the seat belt retractor 3 according to this embodiment is configured as a motor retractor including the torsion bar 12 and the pretensioner 14 and in which the spool 9 is driven to rotate by the driving torque of the motor 16.

As shown in FIG. 2(B), FIGS. 3(A), 3(B), and FIG. 4, the power transmission mechanism 17 includes a motor gear 18, a first intermediate gear 19, a second intermediate gear 20, a sun gear member 21, a carrier 22, a predetermined number of planet gears 23, and an annular internal gear member 24. The sun gear member 21, the carrier 22, the planet gears 23, and the internal gear member 24 constitute a planetary gear mechanism.

The motor gear 18 is attached to a motor shaft 16a of the motor 16 so as to rotate interlocked therewith. Outer teeth 18a of the motor gear 18 are constantly meshed with outer teeth 19a of the first intermediate gear 19. Here, the first intermediate gear 19 is caused to rotate at a reduced speed, by the rotation of the motor gear 18. The second intermediate gear 20 is disposed concentrically with the first intermediate gear 19, and rotates interlocked therewith.

Figure 3A:
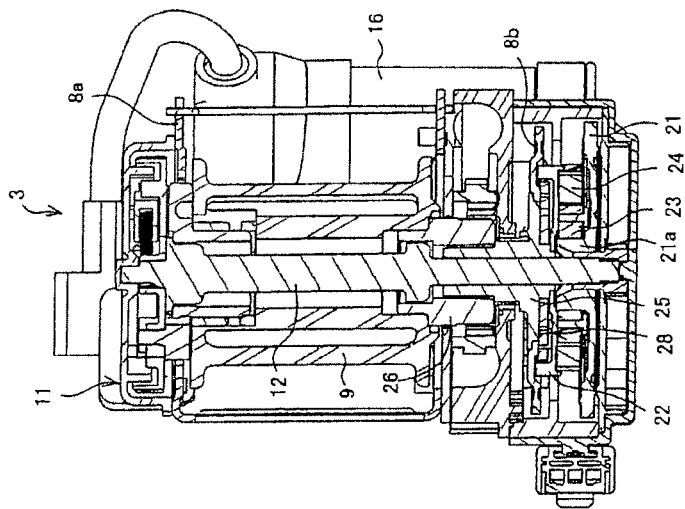
FIG. 3(A) is a cross-sectional view taken along a line IIIA-IIIA in FIG. 2(A)
Figure 3B:
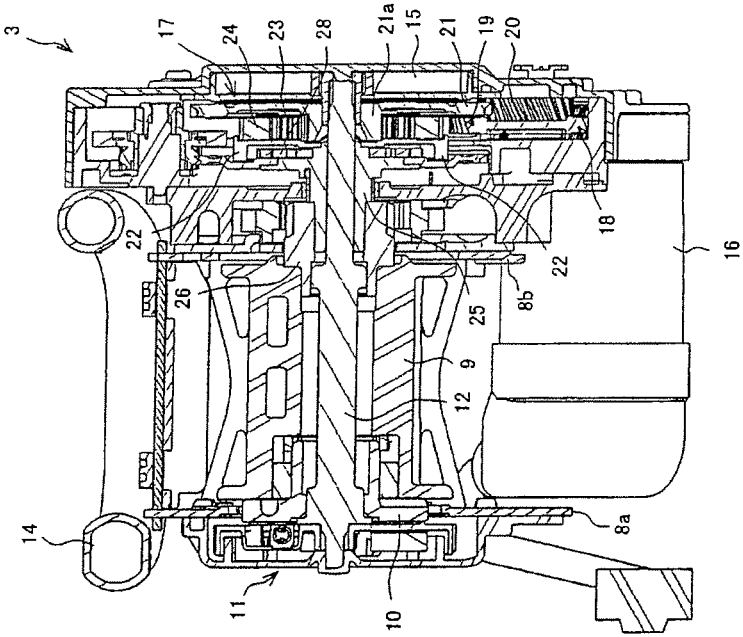
FIG. 3(B) is a cross-sectional view taken along a line IIIB-IIIB in FIG. 2(A).
Figure 4:
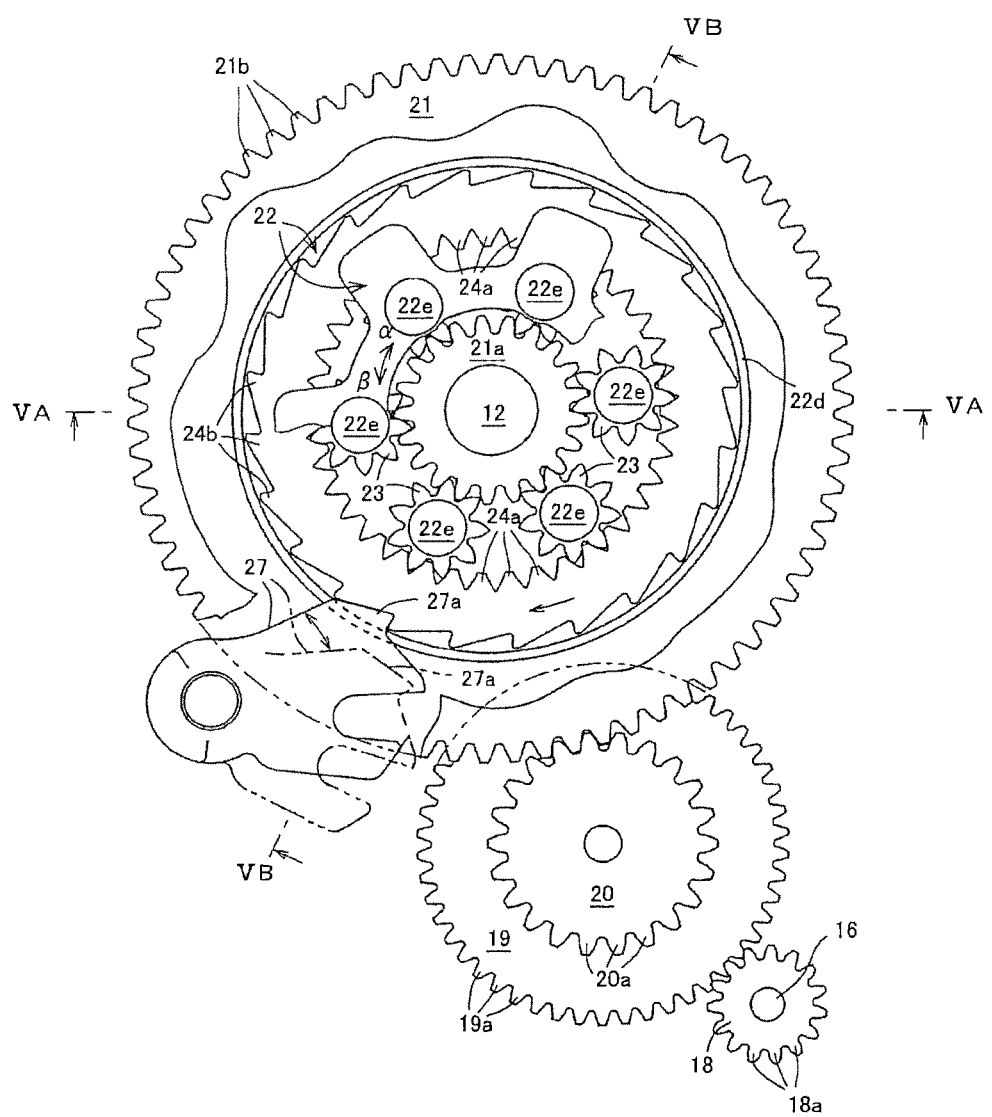
FIG. 4 is a schematic plan view for explaining a power transmission mechanism employed in the seat belt retractor according to the embodiment.
Figure 5A:
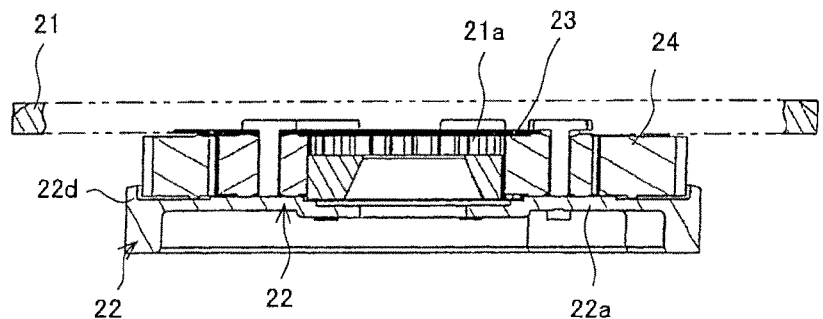
FIG. 5(A) is a cross-sectional view taken along a line VA-VA in FIG. 4.
Figure 5B:
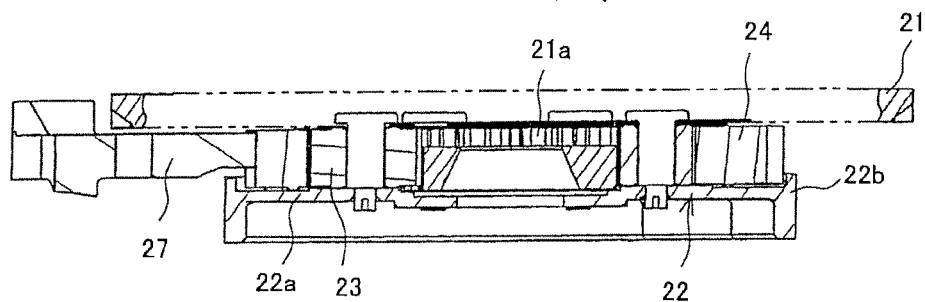
FIG. 5(B) is a cross-sectional view taken along a line VB-VB in FIG. 4.
Figure 6:
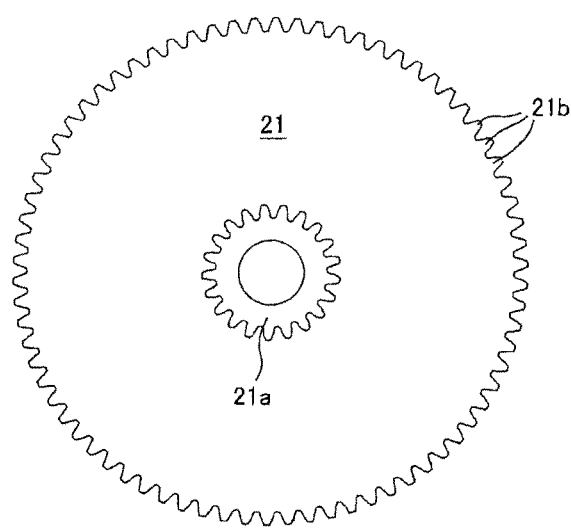
FIG. 6 is a schematic plan view showing a sun gear member of the power transmission mechanism shown in FIG. 4.

As shown in FIGS. 3(A), 3(B), FIG. 4, FIGS. 5(A), 5(B), and FIG. 6, the sun gear member 21 includes an annular sun gear 21a located at the central portion, and outer teeth 21b formed along the outer circumferential edge. Outer teeth 20a of the second intermediate gear 20 are constantly meshed with outer teeth 21b of the sun gear member 21. Here, the sun gear member 21 is caused to rotate at a reduced speed, by the rotation of the second intermediate gear 20. Thus, the sun gear 20a is also caused to rotate at a reduced speed by the rotation of the second intermediate gear 20. The sun gear member 21 is supported by the torsion bar 12 so as to rotate relatively thereto. In FIG. 4, the components of the power transmission mechanism, such as the sun gear member 21 and the carrier 22, are partially cut away for clearer visual understanding.

Figure 7A:
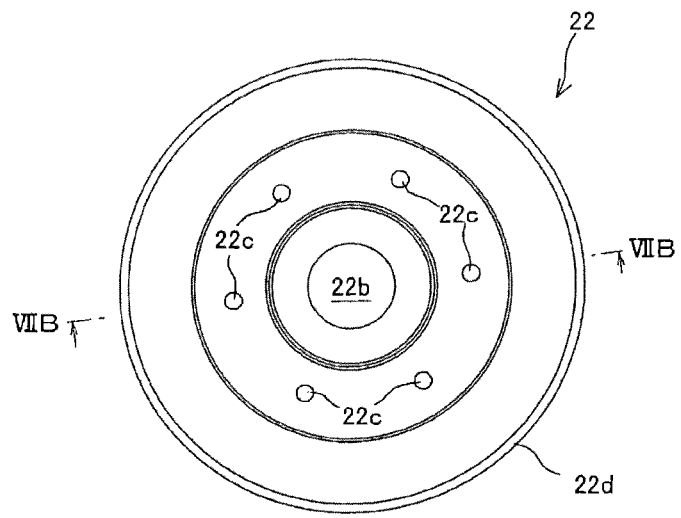
FIG. 7(A) is a plan view showing a carrier of the power transmission mechanism shown in FIG. 4.
Figure 7B:
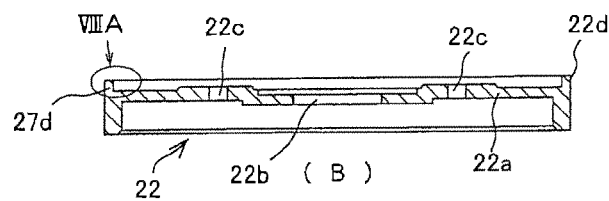
FIG. 7(B) is a cross-sectional view taken along a line VIIB-VIIB in FIG. 7(A).

As shown in FIG. 2(B) and FIGS. 3(A), 3(B), the carrier 22 is disposed so as to rotate interlocked with the spool 9, via a first and a second intermediate member 25, 26. As shown in FIGS. 7(A), 7(B), the carrier 22 includes an annular plate portion 22a. The annular plate portion 22a includes a circular opening 22b formed in a central portion in a relatively large size, six support holes 22c circumferentially aligned at regular intervals along the periphery of the opening 22b and supporting the respective planet gears 23, and a deformation restricting portion 22d formed in a shape of an annular flange to restrict elastic deformation of the internal gear 24. As shown in FIG. 8(A), in this embodiment the deformation restricting portion 22d is formed along the entirety of the outer circumferential edge of the annular plate portion 22a so as to project at the right angle or generally at the right angle with respect to the annular plate portion 22a. An end face 22f of the deformation restricting portion 22d is formed at the right angle or generally at the right angle with respect to the inner and outer circumferential surfaces of the deformation restricting portion 22d (parallel or generally parallel to a face of a clutch pawl 27 to be described later), and the inner circumferential surface of the deformation restricting portion 22d is connected to a surface of the annular plate portion 22a in an edge shape.

As shown in FIG. 2(B), FIGS. 3(A), 3(B), FIG. 4, and FIGS. 5(A), 5(B), six planet gears 23 are circumferentially aligned at regular intervals, and each rotatably supported by a shaft 22e provided in the corresponding support hole 22c of the carrier 22. A rotation sensor 28 is provided on the other side of the carrier 22 opposite to the planet gears 23.

As shown in FIG. 2(B), FIGS. 3(A), 3(B), FIG. 4, FIGS. 5(A), 5(B) and FIG. 9(A), the internal gear member 24 of the annular shape is formed of a noise suppressing material such as a synthetic resin that can be elastically deformed by an external force exerted when the clutch pawl 27 (described later) is engaged with the internal gear member 24. The noise suppressing material may be, for example, nylon 6-6 containing glass fiber, however different materials may be employed provided that the material generates less noise than metals and can be formed into the internal gear member 24. The internal gear member 24 includes a predetermined number of inner teeth 24a formed along the inner circumferential surface and a predetermined number of ratchet teeth 24b formed along the outer circumferential surface. The planet gears 23 are constantly meshed with the sun gear 20a and the inner teeth 24a of the internal gear member 24.

As shown in FIG. 4, the clutch pawl 27 having a lock nail 27a is pivotably supported by the sidewall 8b of the frame 8. The clutch pawl 27 is pivotable between a non-operating position indicated by dash-dot-dot lines in FIG. 4 and an operating position indicated by solid lines in FIG. 4. The lock nail 27a of the clutch pawl 27 is unable to be engaged with the ratchet tooth 24b of the internal gear member 24 in the non-operating position, but can be engaged with the ratchet tooth 24b in the operating position. When the lock nail 27a of the clutch pawl 27 is disengaged from the ratchet tooth 24b of the internal gear member 24, the internal gear member 24 can rotate in either of the seat belt withdrawal direction α and the seat belt retracting direction β. In contrast, when the lock nail 27a of the clutch pawl 27 is engaged with the ratchet tooth 24b of the internal gear member 24, the internal gear member 24 is inhibited from rotating in the seat belt withdrawal direction. The clutch pawl 27 is made to pivot by a non-illustrated clutch pawl driver such as a motor.

Figure 8C:
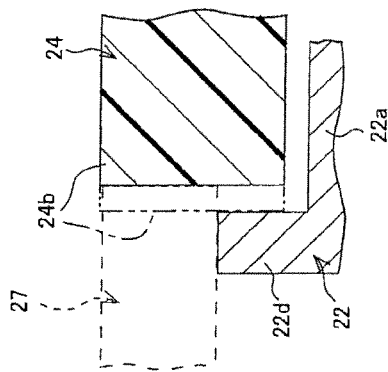
FIG. 8(C) is a cross-sectional view taken along a line VIIC-VIIC in FIG. 8(B).
Figure 8A:
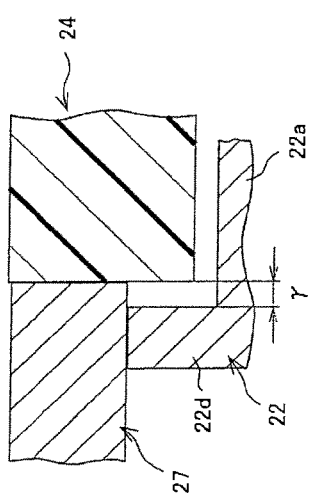
FIG. 8(A) is an enlarged fragmentary cross-sectional view of a portion indicated by VIIIA in FIG. 7(B) and taken along a line VIIIA-VIIIA in FIG. 8(B)
Figure 8B:
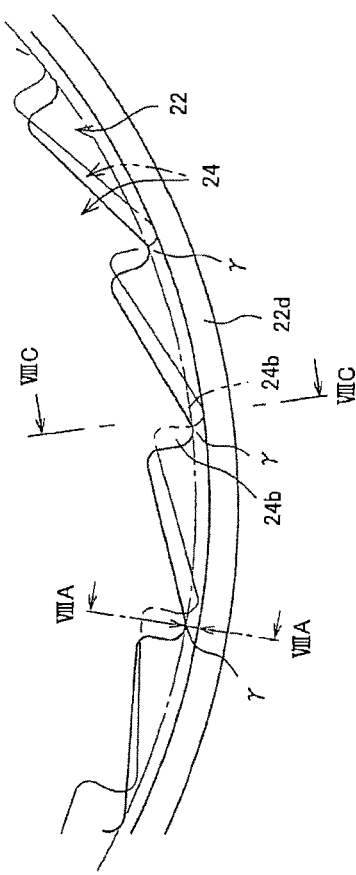
FIG. 8(B) is an enlarged fragmentary drawing of the carrier and the internal gear member.

As stated earlier, since the internal gear member 24 is formed of a noise suppressing material which has a relatively low strength, when the seat belt is about to be withdrawn by the inertia of the occupant with the pawl 17 engaged with the ratchet tooth 24b thus restricting the rotation of the internal gear member 24 in the seat belt withdrawal direction, the internal gear member 24 is partially elastically deformed so as to protrude radially outward, as indicated by dash-dot-dot lines in an enlarged scale in FIGS. 8(B), 8(C). Therefore, the power transmission mechanism 17 according to this embodiment includes the deformation restricting portion 22d that restricts the elastic deformation of the internal gear member 24, formed along the outer circumferential edge of the carrier 22 so as to oppose the ratchet teeth 24b of the internal gear member 24. Here, a predetermined narrow clearance γ is defined between the outermost facet of each of the ratchet teeth 24b of the internal gear member 24 and the inner circumferential surface of the deformation restricting portion 22d. The clearance γ is constant or generally constant with respect to all of the ratchet teeth 24b, in a normal state (during normal operation). The clearance γ allows the internal gear member 24 to smoothly rotate without interfering (contacting) with the inner circumferential surface of the deformation restricting portion 22d, in a normal state. In the case where the internal gear member 24 is elastically deformed as described above, the outermost facet of the ratchet teeth 24b being deformed radially outward abuts against the inner circumferential surface of the deformation restricting portion 22d, so that the elastic deformation of the internal gear member 24 is restricted. Accordingly, the inner teeth 24a of the internal gear member 24 can also be prevented from being deformed. Therefore, the internal gear member 24 can be prevented from being largely deformed, and a phase shift between the teeth of the planet gear 23 and the inner teeth 24a of the internal gear member 24 can be suppressed. The mentioned configuration allows the outer teeth 23a of the planet gear 23 to be stably meshed with the inner teeth 24a of the internal gear member 24, thereby allowing the planet gear 23 to rotate more smoothly. Thus, the clearance γ is determined so as to restrict the elastic deformation of the internal gear member 24 and to secure stable meshing between the outer teeth 23a and the inner teeth 24a.

Figure 9B:
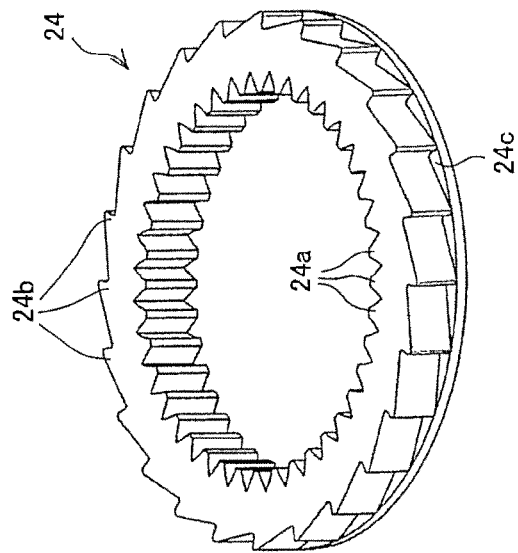
FIG. 9(B) is a perspective view showing a deformation example of the internal gear member.
Figure 9A:
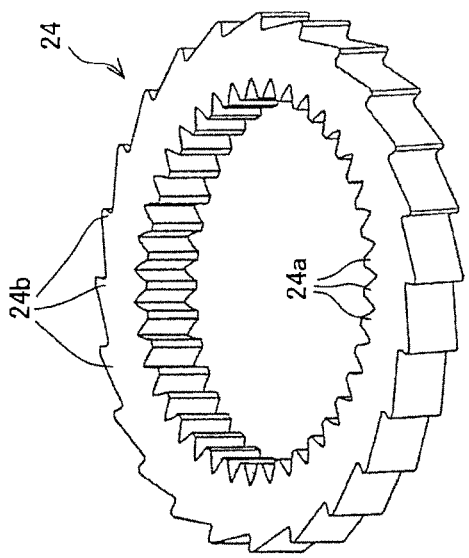
FIG. 9(A) is a perspective view showing the internal gear member of the power transmission mechanism shown in FIG. 4.

In addition to forming the ratchet teeth 24b along the outer circumferential edge of the internal gear member 24 as described above, a circular plate portion 24c may be provided on one of the faces of the internal gear member 24, so as to fill in the space between the ratchet teeth 24b adjacent to each other, as shown in FIG. 9(B). In this case, the outer diameter of the circular plate portion 24c is equal or generally equal to the diameter of a circle formed by connecting the outermost facets of the respective ratchet teeth 24b. With the circular plate portion 24c thus provided along the outer circumferential edge of the internal gear member 24 in addition to the ratchet teeth 24b, the outer circumferential surface of the circular plate portion 24c abuts against the inner circumferential surface of the deformation restricting portion 22d together with the outermost facet of the ratchet teeth 24b when the internal gear member 24 is deformed so as to protrude, thereby restricting the elastic deformation of the internal gear member 24. Such a configuration more effectively prevents the elastic deformation of the internal gear member 24. Further, the circular plate portion 24c contributes to increasing the strength of the internal gear member 24, thus even more effectively restricting the elastic deformation of the internal gear member 24.

The motor 16 and the clutch pawl driver are controlled by a non-illustrated electronic control unit (ECU). More specifically, the ECU controls the operation of the motor 16 and the clutch pawl driver when the ECU decides according to output signals from sensors that the tension of the seat belt 4 fitted on the occupant in a normal state has to be adjusted. Examples of information to be provided from the sensors for the ECU to decide whether the tension of the seat belt 4 has to be adjusted include information on running status of the vehicle such as speed and acceleration, information on vehicle operating status such as brake pedal stamping speed and accelerator stamping speed, and information on the environment of the vehicle such as a distance and relative speed with respect to obstacles around the vehicle.

Hereunder, an operation of the power transmission mechanism 17 configured as above according to this embodiment will be described.

When the clutch pawl 27 is set to the non-operating position, the internal gear member 24 is rotatable in either of the seat belt withdrawal direction α and the seat belt retracting direction β. Then when the motor 16 is driven the driving torque of the motor 16 is transmitted to the sun gear member 21 through the motor gear 18, the first intermediate gear 19, and the second intermediate gear 20. Accordingly, the sun gear 21a is made to rotate. Then the planet gears 23 are caused to rotate and the internal gear member 24 is also made to rotate. When the internal gear member 24 is made to rotate, the planet gears 23 only rotate about the shaft 22e of the carrier 22, and do not revolve around the sun gear 21a. In other words, the carrier 22 is not caused to rotate and therefore the power transmission route of the power transmission mechanism 17 is disconnected. Therefore, the driving torque of the motor 16 is not transmitted to the spool 9.

In contrast, when the clutch pawl 27 is set to the operating position, the internal gear member 24 is disabled from rotating in the seat belt withdrawal direction α. Then when the motor 16 is driven the driving torque of the motor 16 is transmitted to the sun gear member 21 as described above, and the sun gear 21a as well as the planet gears 23 are made to rotate. On the other hand, since the internal gear member 24 is restricted from rotating in the seat belt withdrawal direction α, the planet gears 23 are made to revolve around the sun gear 21a in the seat belt retracting direction β. Then the carrier 22 is caused to rotate in the seat belt retracting direction β at a speed slower than the rotation of the motor 26. In other words, the power transmission route of the power transmission mechanism 17 is connected. Therefore, the driving torque of the motor 16 is transmitted to the spool 9 thereby causing the spool 9 to rotate in the seat belt retracting direction β. Thus, the seat belt 4 is taken up by the spool 9 with the driving torque of the motor 16.

An operation of the seat belt retractor 3 configured as above according to this embodiment will now be described hereunder.

(1) Non-Operating State of Seat Belt Retractor 3

When the seat belt retractor 3 is not operating, the entirety of the seat belt 4 is wound on the spool 9 by the spring mechanism 15. In addition, the deceleration sensing mechanism 13 and the lock mechanism 11 are not activated. Accordingly, locking base 10 can rotate interlocked with the spool 9, and the torsion bar 12 is not distorted and hence does not perform an EA action. In addition, the motor 16 is not activated. In the non-operating state of the seat belt retractor 3, further, the clutch pawl 27 is set to the non-operating position in which the lock nail 27a is not engaged with the ratchet tooth 24b of the internal gear member 24, and the internal gear member 24 is rotatable in either of the seat belt withdrawal direction α and the seat belt retracting direction β. Therefore, the power transmission route of the power transmission mechanism 17 is disconnected.

(2) Withdrawal of Seat Belt 4 in Normal State

When the seat belt 4 is withdrawn, in the non-operating state of the seat belt retractor 3, at a normal withdrawing speed against the biasing force of the spring mechanism 15 for the occupant to wear the seat belt 4, the spool 9 is made to rotate in the seat belt withdrawal direction α. Then the torsion bar 12 and the locking base 10 are also made to rotate interlocked with the spool 9 in the same direction α. Accordingly, the torsion bar 12 is not distorted and does not perform the EA action. Although the carrier 22 is caused to rotate by the rotation of the torsion bar 12, the rotation of the carrier 22 is not transmitted to the sun gear 21a since the power transmission route of the power transmission mechanism 17 is disconnected. Therefore, the rotation of the spool 9 in the seat belt withdrawal direction α under such a condition is not transmitted to the motor 16. Here, the rotation of the spool 9 in the seat belt withdrawal direction α gradually increases the biasing force of the spring mechanism 15.

(3) Fastening of Seat Belt 4

To fasten the seat belt 4, the occupant withdraws the seat belt 4 from the seat belt retractor 3 by a predetermined length and engages the tongue 6 with the buckle 7. When the occupant releases the tongue 6, the portion of the seat belt 4 withdrawn in excess is taken up by the spool 9 with the biasing force of the spring mechanism 15 in the seat belt retractor 3. The seat belt 4 is thus fitted on the occupant. In addition, when the tongue 6 is engaged with the buckle 7, a non-illustrated buckle switch is turned on and the ECU is activated to control the operation of the motor 16 and the clutch pawl driver.

(4) Withdrawal of Seat Belt 4 in Normal Use

In a normal state, in which the seat belt 4 is fitted on the occupant and the deceleration sensing mechanism 13 and the pretensioner 14 are not activated, when the seat belt 4 is withdrawn the spool 9 is made to rotate in the seat belt withdrawal direction α and thus allows the seat belt 4 to be withdrawn. In the case of such withdrawal of the seat belt 4 in the normal state, the deceleration sensing mechanism 13 is not activated and hence the lock mechanism 11 is not activated either, and the spool 9 can rotate together with the torsion bar 12 and the locking base 10. Therefore, the seat belt 4 can be easily withdrawn. In this case, the ECU decides that the tension of the seat belt 4 does not need to be adjusted, because of the seat belt 4 being normally fastened and according to output signals of the sensors, and hence does not drive the motor 16 and the clutch pawl driver. Therefore, the internal gear member 24 is freely rotatable and the power transmission mechanism 17 is disconnected.

(5) Disengagement of Seat Belt 4

When the occupant disengages the tongue 6 from the buckle 7 to put off the seat belt 4 and releases the tongue 6, a retractable portion of the seat belt 4 is taken up by the spool 9 with the biasing force of spring mechanism 15 in the seat belt retractor 3. At this point, the buckle switch is turned off and the ECU stops controlling the operation of the motor 16 and the clutch pawl driver.

(6) Emergency Case with Seat Belt 4 Fastened

In an emergency case that has occurred while the seat belt 4 is fastened, the pretensioner 14 is activated so as to cause the spool 9 to rotate in the seat belt retracting direction, thus retracting the seat belt 4. Accordingly, the binding force of the seat belt 4 exerted on the occupant is increased. In addition, in case that a deceleration sufficiently large to activate the deceleration sensing mechanism 13 is applied to the running vehicle, the deceleration sensing mechanism 13 is activated so as to activate the lock mechanism 11. Then a non-illustrated pawl provided on the locking base 10 is made to pivot to be engaged with a non-illustrated locking tooth formed on the sidewall 8a. Accordingly, it becomes possible to lock the rotation of the locking base 10 in the seat belt withdrawal direction α. After the action of the pretensioner 14 is completed, the spool 9 and the locking base 10 are about to rotate in the seat belt withdrawal direction α, because the inertia of the occupant is exerted in the direction to withdraw the seat belt 4. At this point, since the rotation of the locking base 10 in the seat belt withdrawal direction α is able to be locked, the rotation of the locking base 10 in the seat belt withdrawal direction α is immediately locked and the spool 9 is about to relatively rotate in the seat belt withdrawal direction α with respect to the locking base 10. As a result, the spool 9 rotates in the seat belt withdrawal direction α distorting the torsion bar 12. The torsion bar 12 restricts the rotation of the spool 9 in the seat belt withdrawal direction α with the resistance generated from the torsional deformation. The kinetic energy of the occupant is partially absorbed by the torsional deformation of the torsion bar, and therefore the force of the seat belt 4 imposed on the occupant is limited. Thus, the occupant is restrained by the seat belt 4.

(7) Retracting of Seat Belt 4 by Driving Torque of Motor 16

In the normal fastening state of the seat belt 4, the buckle switch is on and hence the ECU can control the operation of the motor 16 and the clutch pawl driver, as stated above. When the ECU decides according to the output signals from the sensors that the tension of the seat belt 4 has to be adjusted in such a state, the ECU drives the motor 16 so as to cause the spool 9 to rotate in the seat belt retracting direction β, and drives the clutch pawl driver so as to set the clutch pawl 27 to the operating position, and then stops driving the clutch pawl driver. Then the lock nail 27a of the clutch pawl 27 is engaged with the ratchet tooth 24b thus to inhibit the rotation of the internal gear member 24 in the seat belt withdrawal direction α, and hence the power transmission route of the power transmission mechanism 17 is connected. In addition, the ECU drives the motor 16 so as to cause the spool 9 to rotate in the seat belt retracting direction β. Accordingly, the driving torque of the motor 16 of a magnitude decided by the ECU according to the output signals from the sensors is transmitted to the spool 9, and the spool 9 retracts the seat belt 4 by an amount based on the driving torque. Therefore, the tension of the seat belt 4 is increased and a greater binding force of the seat belt 4 is imposed on the occupant.

As described above, since the internal gear member 24 is formed of an elastically deformable noise suppressing material, when the seat belt 4 is about to be withdrawn by the inertia of the occupant with the rotation of the internal gear member 24 being restricted, the internal gear member 24 is partially elastically deformed so as to protrude radially outward. However, the deformation restricting portion 22d of the carrier 22 serves to restrict the elastic deformation of the internal gear member 24 as stated above. Such a configuration allows the planet gears 23 to be stably meshed with the inner teeth 24a of the internal gear member 24, thus allowing the planet gears 23 to smoothly rotate.

(8) Cancellation of Seat Belt 4 Retraction by Driving Torque of Motor 16

When the ECU decides according to the output signals from the sensors that the tension of the seat belt 4 no longer has to be adjusted after the seat belt 4 is retracted by the driving torque of the motor 16, the ECU stops driving the motor 16 and inversely drives the clutch pawl driver so as to set the clutch pawl 27 to the non-operating position, and then stops inversely driving the clutch pawl driver. Since the internal gear member 24 is now allowed to rotate in either of the seat belt withdrawal direction α and the seat belt retracting direction β when the clutch pawl 27 is set to the non-operating position, the power transmission route of the power transmission mechanism 17 is disconnected.

In the seat belt retractor 3 configured as above according to this embodiment, the internal gear member 24 of the planetary gear mechanism employed in the power transmission mechanism 17 is formed of an elastically deformable noise suppressing material such as a synthetic resin, and therefore generation of noise can be suppressed during the operation of the planetary gear mechanism. Accordingly, the quietness of the power transmission mechanism 17 during the operation can be effectively improved.

In addition, since the internal gear member 24 is formed of a noise suppressing material, the strength of the internal gear member 24 is degraded compared with the case where the internal gear member 24 is formed of a metal and hence the internal gear member 24 is prone to be partially elastically deformed so as to protrude radially outward of the annular shape. However, since the carrier 22 includes the deformation restricting portion 22d formed in the annular flange shape along the outer circumferential edge, the deformation restricting portion 22d effectively prevents the deformation of the internal gear member 24. Such a configuration allows the outer teeth 23a of the planet gear 23 and the inner teeth 24a of the internal gear member 24 to be stably meshed with each other, thereby allowing the planet gear 23 to smoothly rotate. Thus, the planetary gear mechanism 17 in the seat belt retractor 3 is capable of effectively improving the quietness and stabilizing the power transmission.

Further, the deformation restricting portion 22d serves to restrict the deformation of the internal gear member 24 only when it is necessary to restrict the deformation. Accordingly, the internal gear member 24 is kept from contacting the deformation restricting portion 22d during the normal operation. Therefore, despite the internal gear member 24 being formed of a noise suppressing material which is relatively susceptible to wear, the wear of the internal gear member 24 due to contacts with the deformation restricting portion 22d can be reduced, and also generation of noise because of a contact between the internal gear member 24 and the deformation restricting portion 22d can be suppressed. In particular, forming the deformation restricting portion 22d on the carrier 22 as an annular flange effectively protects the internal gear member 24 from wearing with a simple structure, and effectively suppresses generation of noise due to the contact between the internal gear member 24 and the deformation restricting portion 22d.

Further, although the strength of the internal gear member 24 is degraded because of employing a noise suppressing material to form the internal gear member 24, the deformation restricting portion 22d serves to prevent the deformation of the internal gear member 24. Therefore, the internal gear member 24 can be made small and compact, and the seat belt retractor 3 can maintain the compactness.

Still further, the seat belt unit 1 including the seat belt retractor 3 according to this embodiment is capable of further improving the quietness inside the vehicle interior and reliability in binding performance for the occupant, since the seat belt retractor 3 is capable of improving the quietness and stability in power transmission.

Figure 10A:
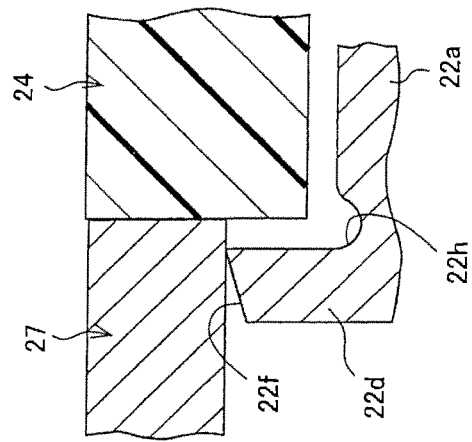
FIG. 10(A) is an enlarged fragmentary cross-sectional view corresponding to FIG. 8(A) and showing a seat belt retractor according to another embodiment of the present invention.
Figure 10B:
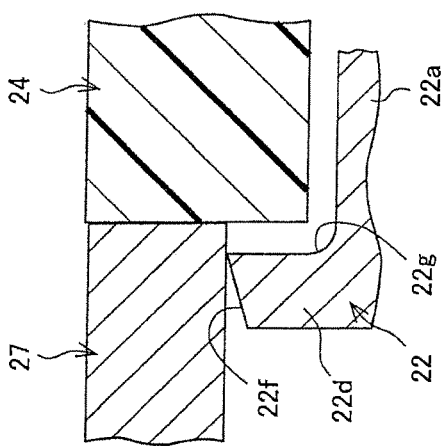
FIG. 10(B) is an enlarged fragmentary cross-sectional view corresponding to FIG. 8(A) and showing a seat belt retractor according to still another embodiment of the present invention.

FIGS. 10(A), 10(B) are fragmentary cross-sectional views corresponding to FIG. 8(A), showing a seat belt retractor according to another embodiment of the present invention.

In the foregoing embodiment, the end face 22f of the deformation restricting portion 22d is formed at the right angle or generally at the right angle with respect to the outer circumferential surface of the deformation restricting portion 22d, and the inner circumferential surface of the deformation restricting portion 22d is connected to a surface of the annular plate portion 22a in an edge shape. In contrast, in the seat belt retractor 3 shown in FIG. 10(A), the end face 22f of the deformation restricting portion 22d of the carrier 22 is formed as a sloped face such that the end face 22f becomes gradually higher toward the inner circumferential surface of the deformation restricting portion 22d from the outer circumferential surface thereof. Such a configuration allows the clutch pawl 27 to smoothly move guided along the sloped end face 22f without interfering with the deformation restricting portion 22d, when the clutch pawl 27 is displaced from the non-operating position to the operating position over the end face 22f of the deformation restricting portion 22d. In other words, the end face 22f of the deformation restricting portion 22d serves as the guiding surface for the clutch pawl 27.

In the carrier 22 shown in FIG. 10(A), the inner circumferential surface of the deformation restricting portion 22d and the surface of the annular plate portion 22a are connected via a curved rounded portion 22g. When the internal gear member 24 is deformed so as to protrude and abuts against the inner circumferential surface of the deformation restricting portion 22d, the rounded portion 22g contributes to alleviating the stress concentration at the boundary between the inner circumferential surface of the deformation restricting portion 22d and the surface of the annular plate portion 22a.

Further, in the carrier 22 shown in FIG. 10(B), the boundary between the inner circumferential surface of the deformation restricting portion 22d and the surface of the annular plate portion 22a is formed as a recessed portion 22h having an arcuate cross-sectional shape, unlike the rounded portion 22g of the carrier 22 shown in FIG. 10(A). In other words, the recessed portion 22h is formed in the annular plate portion 22a so as to recede along the inner circumferential surface of the deformation restricting portion 22d. Such a recessed portion 22h also contributes to alleviating the stress concentration at the boundary, as the configuration shown in FIG. 10(A).

The configuration and advantageous effects of the remaining portion of the seat belt retractor 3 shown in FIGS. 10(A), 10(B) are the same as those of the foregoing embodiment.

Figure 11:
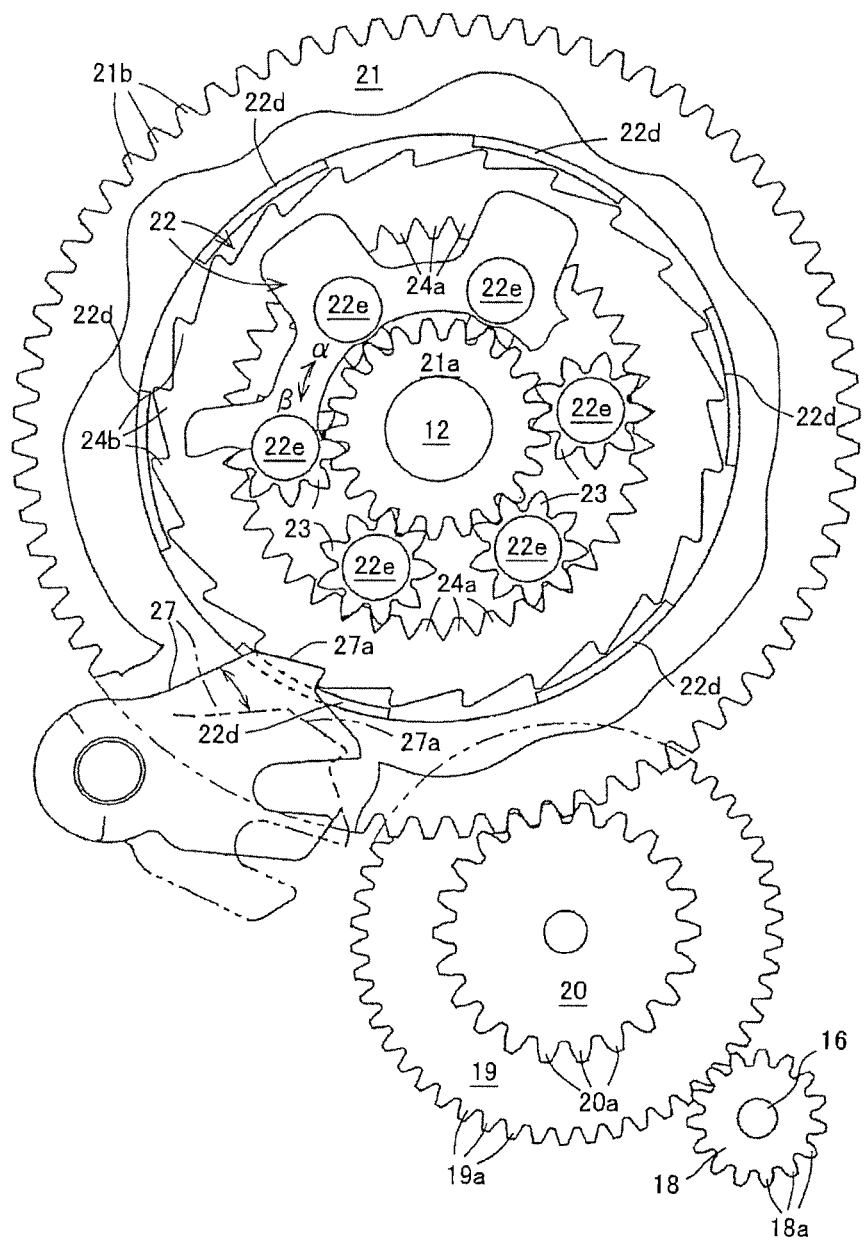
FIG. 11 is a schematic plan view corresponding to FIG. 4 and showing a seat belt retractor according to still another embodiment of the present invention.

FIG. 11 is a schematic plan view corresponding to FIG. 4, showing a seat belt retractor according to still another embodiment of the present invention.

While the deformation restricting portion 22d according to the embodiment shown in FIG. 4 is continuously formed along the entire outer circumferential edge of the carrier 22, in the power transmission mechanism 17 of the seat belt retractor 3 according to this embodiment the deformation restricting portion 22d is, as shown in FIG. 11, discontinuously formed along the outer circumferential edge of the carrier 22 in an arcuate shape, in predetermined regions opposing the respective planet gears 23. A reason of the discontinuously forming the deformation restricting portion 22d is that, since the protruding deformation of the internal gear member 24 takes place in the meshing region between the outer teeth 23a of the planet gear 23 and the inner teeth 24a of the internal gear member 24 and in the vicinity of such a meshing region, the protruding deformation of the internal gear member 24 can be more efficiently restricted. Accordingly, the predetermined region where the deformation restricting portion 22d is formed includes at least the meshing region between the outer teeth 23a of the planet gear 23 and the inner teeth 24a of the internal gear member 24.

The configuration and advantageous effects of the remaining portion of the seat belt retractor 3 according to this embodiment are the same as those of the foregoing embodiment.

FIG. 12(A) is a schematic plan view showing a carrier and an internal gear member of a seat belt retractor according to still another embodiment of the present invention, and FIG. 12(B) is an enlarged fragmentary cross-sectional view taken along a line XIIB-XIIB in FIG. 12(A).

In the foregoing embodiments, the deformation restricting portion 22d is formed along the outer circumferential edge of the carrier 22, such that when the internal gear member 24 is deformed the outermost facet of each of the ratchet teeth 24b abuts against the outer circumferential edge of the carrier 22. In contrast, in the power transmission mechanism 17 of the seat belt retractor 3 according to this embodiment, when the internal gear member 24 is deformed a portion of the internal gear member 24 other than the ratchet teeth 24b is engaged with the deformation restricting portion 22d formed on a region of the carrier 22 other than the outer circumferential edge, as shown in FIGS. 12(A) and 12(B).

More specifically, the deformation restricting portion 22d according to this embodiment is formed along the entire circumference at a predetermined position on the carrier 22 inner than the outer circumferential edge 22i, so as to form an annular projection concentric with the carrier 22. In addition, the lateral surface of the annular internal gear member 24 opposing the carrier 22 includes an annular groove 24d concentric with the internal gear member 24. To be more detailed, the annular groove 24d and the annular projection of the deformation restricting portion 22d are opposed to each other when the carrier 22 and the internal gear member 24 are assembled together, and the annular projection is fitted in the annular groove 24d so as not to contact, in a normal state, a portion of the carrier 22 constituting the annular groove 24d. Further, in a normal state upon assembling the carrier 22 and the internal gear member 24, a predetermined narrow clearance γ is defined as in the foregoing embodiments, between the inner circumferential surface 22j of the annular projection constituting the deformation restricting portion 22d and the inner wall surface 24e of the annular groove 24d opposing the inner circumferential surface 22j.

In the power transmission mechanism 17 according to this embodiment, when the internal gear member 24 is deformed the inner wall surface 24e of the annular groove 24d abuts against the inner circumferential surface 22j of the deformation restricting portion 22d, and thus the deformation of the internal gear member 24 is restricted.

With the power transmission mechanism 17 according to this embodiment, in which the deformation restricting portion 22d is formed as an annular projection on the carrier 22, the wear of the internal gear member 24, as well as generation of noise due to contacts between the internal gear member 24 and the deformation restricting portion 22d can be effectively suppressed with a simple structure.

The configuration and advantageous effects of the remaining portion of the seat belt retractor 3 according to this embodiment are the same as those of the structure shown in FIG. 4. Here, the annular projection constituting the deformation restricting portion 22d may be discontinuously formed in the circumferential direction so as to oppose the planet gears 23, as the embodiment shown in FIG. 1. In this case, the annular groove 24d is continuously formed along the entire circumference of the carrier 22. Alternatively, the deformation restricting portion 22d may be formed as an annular groove, and an annular projection to be fitted in the annular groove so as to define the narrow clearance γ may be formed on the internal gear member 24.

Figure 13B:
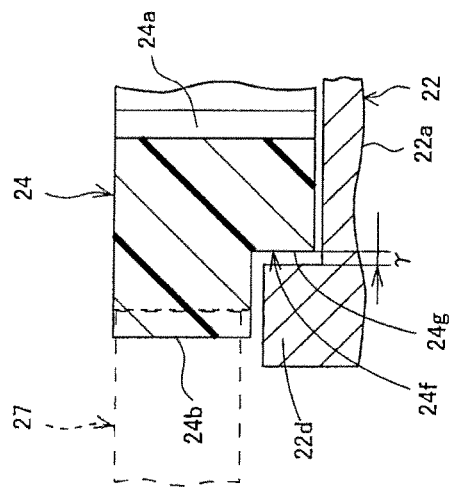
FIG. 13(B) is an enlarged fragmentary cross-sectional view taken along a line XIIIB-XIIIB in FIG. 13(A).
Figure 13A:
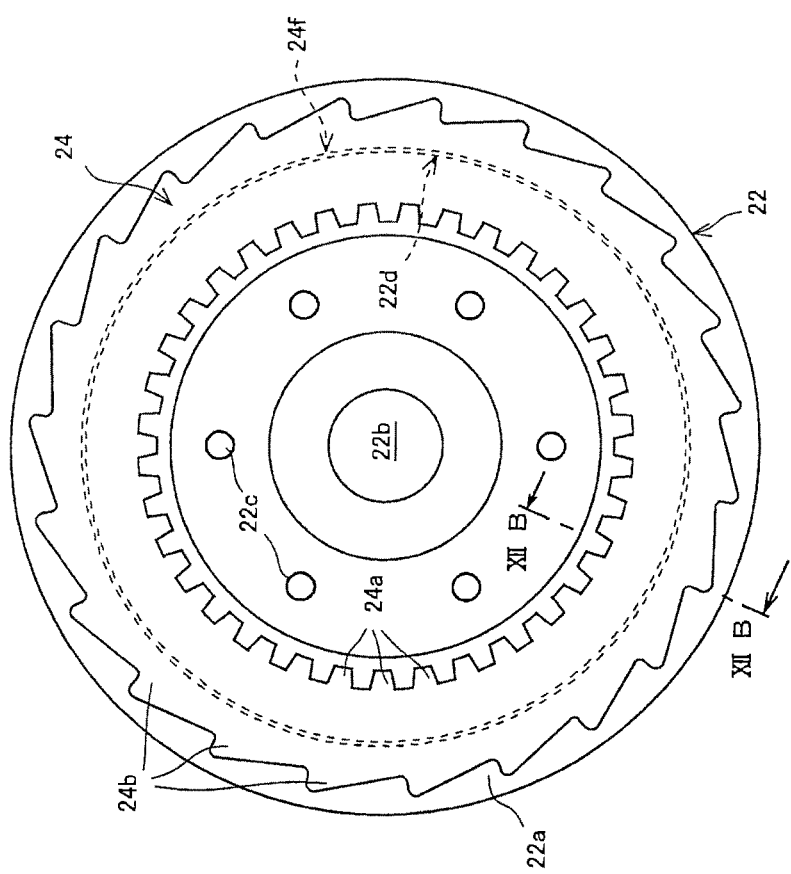
FIG. 13(A) is a schematic plan view showing a carrier and an internal gear member of a seat belt retractor according to still another embodiment of the present invention.
Figure 14A:
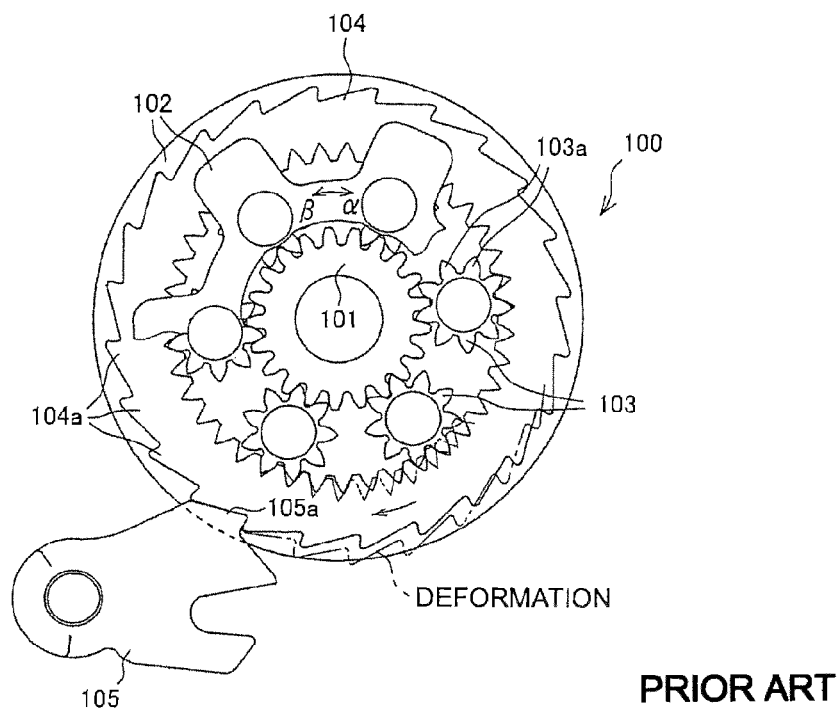
FIG. 14(A) is a schematic plan view showing a part of a power transmission mechanism of a conventional seat belt retractor.
Figure 14B:
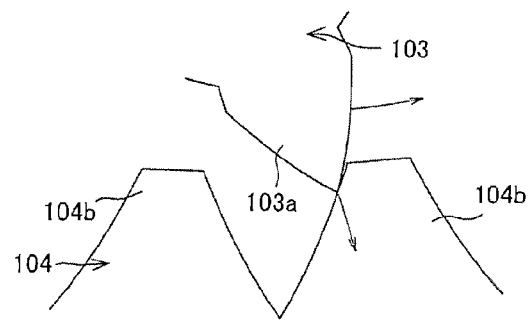
FIG. 14(B) is an enlarged fragmentary plan view for explaining the operation of the power transmission mechanism shown in FIG. 14(A).

FIG. 13(A) is a schematic plan view showing a carrier and an internal gear member of a seat belt retractor according to still another embodiment of the present invention, and FIG. 13(B) is an enlarged fragmentary cross-sectional view taken along a line XIIIB-XIIIB in FIG. 13(A).

In the embodiment shown in FIG. 4, when the internal gear member 24 is deformed the outermost facet of each of the ratchet teeth 24b abuts against the deformation restricting portion 22d formed along the outer circumferential edge of the carrier 22, and thus the deformation of the internal gear member 24 is restricted. In contrast, in the power transmission mechanism 17 of the seat belt retractor 3 according to this embodiment shown in FIGS. 13(A) and 13(B), when the internal gear member 24 is deformed a portion of the internal gear member 24 other than the ratchet teeth 24b abuts against the deformation restricting portion 22d formed on the carrier 22.

More specifically, an annular region on the surface of the internal gear member 24 according to this embodiment opposing the carrier 22 includes an annular stepped portion 24f which is concentric with the internal gear member 24. In a normal state upon assembling the carrier 22 and the internal gear member 24 together, a predetermined narrow clearance γ is defined as in the foregoing embodiments, between the deformation restricting portion 22d formed as an annular flange and the wall surface 24g of the annular stepped portion 24f. Accordingly, the annular stepped portion 24f is kept from contacting the deformation restricting portion 22d in a normal state after the carrier 22 and the internal gear member 24 are assembled together.

In the power transmission mechanism 17 according to this embodiment, when the internal gear member 24 is deformed the wall surface 24g of the annular stepped portion 24f abuts against the deformation restricting portion 22d, and thus the deformation of the internal gear member 24 is restricted.

The configuration and advantageous effects of the remaining portion of the seat belt retractor 3 according to this embodiment are the same as those of the structure shown in FIG. 4. Here, the deformation restricting portion 22d may be discontinuously formed in the circumferential direction so as to oppose the planet gears 23, as the embodiment shown in FIG. 11. In this case, the annular stepped portion 24f is continuously formed on the carrier 22 along the entire circumference. In addition, it is not mandatory to form the deformation restricting portion 22d along the outer circumferential edge of the carrier 22, and the deformation restricting portion 22d may be continuously or discontinuously formed as an annular projection concentric with the carrier 22, as in the embodiment shown in FIG. 12.

The seat belt retractor and the seat belt unit according to the present invention are in no way limited to the foregoing embodiments, but may be modified in various manners within the scope set forth in the appended claims.

INDUSTRIAL APPLICABILITY

The configuration according to the present invention is suitably applicable to a seat belt retractor provided in a vehicle such as an automobile and configured to retract a seat belt for binding an occupant with a spool to which rotation of a motor is transmitted at a reduced speed via a power transmission mechanism including a planetary gear mechanism, and to a seat belt unit that includes such a seat belt retractor.

REFERENCE SIGNS LIST

1 SEAT BELT UNIT
3 SEAT BELT RETRACTOR
4 SEAT BELT
6 TONGUE
7 BUCKLE
9 SPOOL
10 LOCKING BASE
11 LOCK MECHANISM
12 TORSION BAR
13 DECELERATION SENSING MECHANISM
14 PRETENSIONER
15 SPRING MECHANISM
16 MOTOR
17 POWER TRANSMISSION MECHANISM
21 SUN GEAR MEMBER
22 CARRIER
22a ANNULAR PLATE PORTION
22d SHAPE KEEPING MEMBER
22f END FACE
22i OUTER CIRCUMFERENTIAL EDGE OF CARRIER 22
22j INNER CIRCUMFERENTIAL SURFACE OF ANNULAR PROJECTION
23 PLANET GEAR
24 INTERNAL GEAR MEMBER
24a INNER TEETH
24b RATCHET TEETH
27 CLUTCH PAWL
27a LOCK NAIL
24c CIRCULAR PLATE PORTION
24d ANNULAR GROOVE
24e INNER WALL SURFACE OF ANNULAR GROOVE 24d
24f ANNULAR STEPPED PORTION
24g WALL SURFACE OF ANNULAR STEPPED PORTION 24f

The invention claimed is:
1. A seat belt retractor comprising:
a spool on which a seat belt is taken up; a motor that generates a driving torque for rotating the spool; and a power transmission mechanism that transmits the driving torque of the motor to the spool via a planetary gear mechanism, the seat belt retractor being configured to take up the seat belt on the spool by using the driving torque of the motor,
wherein the planetary gear mechanism includes a sun gear to which the driving torque of the motor is transmitted, a rotatable internal gear member including inner teeth formed along an inner circumferential surface and ratchet teeth formed along an outer circumferential surface, a predetermined number of planet gears each meshed with both of the sun gear and the inner teeth of the internal gear member, and a carrier that rotatably supports the predetermined number of planet gears and transmits the driving torque of the motor to the spool.

the power transmission mechanism includes a clutch pawl set to move between a non-operating position where the clutch pawl is disengaged from the ratchet teeth of the internal gear member thereby allowing the internal gear member to rotate thus disconnecting a power transmission route and an operating position where the clutch pawl is engaged with one of the ratchet teeth of the internal gear member thereby inhibiting the internal gear member from rotating thus connecting the power transmission route, the internal gear member is formed of a noise suppressing material that suppresses noise generated when the planetary gear mechanism is operating, and the seat belt retractor further includes a deformation restricting portion that restricts deformation of the internal gear member.

2. The seat belt retractor according to claim 1, wherein the deformation restricting portion is provided on the carrier.

3. The seat belt retractor according to claim 2, wherein the carrier includes an annular portion, and the deformation restricting portion is formed in an annular shape along the annular portion of the carrier so as to restrict deformation of the internal gear member when the internal gear member about to be deformed makes contact with the deformation restricting portion.

4. The seat belt retractor according to claim 3, wherein the annular deformation restricting portion is continuously formed along the entire circumference of the annular shape thereof, or discontinuously formed along the circumference of the annular shape thereof in predetermined regions of the carrier opposing the respective planet gears.

5. The seat belt retractor according to claim 4, wherein the annular deformation restricting portion is formed as an annular flange or an annular projection.

6. The seat belt retractor according to claim 1, wherein the noise suppressing material is a synthetic resin.

7. A seat belt unit comprising:

a seat belt that binds an occupant; a seat belt retractor that retracts the seat belt; a tongue slidably supported by the seat belt; and a buckle with which the tongue is engaged upon being inserted therein, the seat belt being arranged to be fitted on the occupant when the tongue is engaged with the buckle upon being inserted therein, wherein the seat belt retractor is the seat belt retractor according to claim 1.

* * * * *